(12) United States Patent
Sindia et al.

(10) Patent No.: US 10,516,304 B2
(45) Date of Patent: Dec. 24, 2019

(54) WIRELESS CHARGING COIL PLACEMENT FOR REDUCED FIELD EXPOSURE

(71) Applicant: INTEL CORPORATION, Santa Clara, CA (US)

(72) Inventors: Suraj Sindia, Hillsboro, OR (US); Songnan Yang, San Jose, CA (US); Zhen Yao, San Jose, CA (US); Robert F. Kwasnick, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 350 days.

(21) Appl. No.: 14/978,386

(22) Filed: Dec. 22, 2015

(65) Prior Publication Data

US 2017/0179731 A1    Jun. 22, 2017

(51) Int. Cl.
*H02J 50/70* (2016.01)
*H02J 50/10* (2016.01)
*H02J 50/12* (2016.01)

(52) U.S. Cl.
CPC .............. *H02J 50/70* (2016.02); *H02J 50/10* (2016.02); *H02J 50/12* (2016.02)

(58) Field of Classification Search
CPC ...................................................... H02J 50/70
See application file for complete search history.

(56) References Cited

U.S. PATENT DOCUMENTS

| | | | | |
|---|---|---|---|---|
| 5,453,686 A | * | 9/1995 | Anderson | G01S 5/0247 324/207.17 |
| 7,825,543 B2 | * | 11/2010 | Karalis | B60L 11/182 307/104 |
| 8,076,801 B2 | * | 12/2011 | Karalis | H01Q 1/02 307/104 |
| 8,704,513 B2 | * | 4/2014 | Lepage | G01N 27/9033 324/239 |
| 8,754,609 B2 | * | 6/2014 | Tsai | H02J 5/005 320/108 |

(Continued)

FOREIGN PATENT DOCUMENTS

| | | |
|---|---|---|
| CN | 103339698 A | 10/2013 |
| CN | 13262770 A | 10/2014 |

(Continued)

OTHER PUBLICATIONS

PCT International Search Report, PCT Application No. PCT/US2016/057386, completion date Jan. 20, 2017, 3 pages.

(Continued)

*Primary Examiner* — Thomas J. Hiltunen

(74) *Attorney, Agent, or Firm* — International IP Law Group, P.L.L.C.

(57) ABSTRACT

An apparatus is described herein. The apparatus includes a power transmit unit coil and an active shielding coil. The power transmit unit coil includes a set of main windings, positioned at a first location on a structure, to carry a first current in a first direction, wherein the first current is to cause an electromagnetic field to emanate from the power transmit unit coil. The active shielding coil is positioned at a second location on the structure and is to carry a second current in a direction substantially opposite the first direction wherein the second current is to cause a reduction of the size of the electromagnetic field.

19 Claims, 17 Drawing Sheets

(56) References Cited

U.S. PATENT DOCUMENTS

| | | | | |
|---|---|---|---|---|
| 8,855,554 B2* | 10/2014 | Cook | | H02J 5/005 |
| | | | | 455/41.1 |
| 9,166,413 B2* | 10/2015 | Hashiguchi | | H02J 5/005 |
| 9,312,729 B2 | 4/2016 | Yasuda et al. | | |
| 9,502,922 B2* | 11/2016 | Hasegawa | | H01M 10/46 |
| 9,548,621 B2* | 1/2017 | Asanuma | | H01F 38/14 |
| 9,590,445 B2* | 3/2017 | Aerts | | H02J 7/0044 |
| 9,601,933 B2* | 3/2017 | Graham | | H02J 7/0042 |
| 9,620,964 B2* | 4/2017 | Terao | | G01S 17/87 |
| 9,793,045 B2* | 10/2017 | Abe | | B60L 11/182 |
| 10,012,725 B2* | 7/2018 | Sieber | | B60L 11/1838 |
| 10,090,713 B2* | 10/2018 | Gaskill | | H02J 50/90 |
| 2004/0222792 A1* | 11/2004 | St. Pierre | | G01R 33/5659 |
| | | | | 324/307 |
| 2004/0268278 A1* | 12/2004 | Hoberman | | G06F 1/3203 |
| | | | | 716/127 |
| 2005/0148858 A1* | 7/2005 | Hargreaves | | A61B 5/055 |
| | | | | 600/410 |
| 2007/0007821 A1* | 1/2007 | Rossetti | | H02J 17/00 |
| | | | | 307/22 |
| 2009/0224608 A1* | 9/2009 | Cook | | H01Q 7/08 |
| | | | | 307/104 |
| 2010/0172168 A1 | 7/2010 | Fells | | |
| 2011/0239013 A1* | 9/2011 | Muller | | G06F 1/3221 |
| | | | | 713/320 |
| 2012/0080957 A1* | 4/2012 | Cooper | | H02J 5/005 |
| | | | | 307/104 |
| 2012/0229140 A1* | 9/2012 | Shimokawa | | H02J 5/005 |
| | | | | 324/318 |
| 2013/0049482 A1* | 2/2013 | Rofe | | H02J 5/005 |
| | | | | 307/104 |
| 2013/0049484 A1* | 2/2013 | Weissentern | | H02J 5/005 |
| | | | | 307/104 |
| 2013/0093252 A1* | 4/2013 | Norconk | | H02J 5/005 |
| | | | | 307/104 |
| 2013/0147283 A1* | 6/2013 | Kawano | | H01F 27/346 |
| | | | | 307/104 |
| 2013/0289383 A1* | 10/2013 | Flynn | | A61B 5/05 |
| | | | | 600/409 |
| 2014/0315024 A1 | 10/2014 | Muramatsu et al. | | |
| 2015/0022020 A1 | 1/2015 | Borngräber | | |
| 2015/0091518 A1 | 4/2015 | Komma et al. | | |
| 2015/0014533 A1 | 5/2015 | Chiyo et al. | | |
| 2015/0197155 A1 | 7/2015 | Lu et al. | | |
| 2015/0364938 A1 | 12/2015 | Lapetina et al. | | |
| 2016/0049698 A1* | 2/2016 | Kawano | | H01M 10/46 |
| | | | | 320/108 |
| 2016/0121732 A1* | 5/2016 | Matsumoto | | B60L 11/18 |
| | | | | 307/10.1 |
| 2016/0181875 A1* | 6/2016 | Long | | H02J 50/90 |
| | | | | 320/108 |
| 2016/0241038 A1* | 8/2016 | Netreba | | H02J 3/383 |
| 2016/0243949 A1* | 8/2016 | Merkel | | H02J 7/025 |
| 2016/0261142 A1* | 9/2016 | Park | | H02J 50/40 |
| 2016/0276948 A1* | 9/2016 | Adamczyk | | H02J 1/02 |
| 2016/0329748 A1 | 11/2016 | White, II et al. | | |
| 2017/0012475 A1* | 1/2017 | Zhang | | H02J 7/025 |
| 2017/0035402 A1* | 2/2017 | Matsui | | A61B 17/34 |
| 2017/0104371 A1* | 4/2017 | Wakabayashi | | H02J 50/10 |
| 2017/0106759 A1* | 4/2017 | Yamakawa | | B60L 11/182 |
| 2017/0155286 A1* | 6/2017 | Kato | | H02J 50/12 |
| 2017/0155288 A1* | 6/2017 | Lee | | H02J 50/23 |
| 2017/0170688 A1* | 6/2017 | Maniktala | | H02J 50/12 |
| 2017/0187209 A1* | 6/2017 | Yao | | H02J 7/0042 |
| 2017/0222493 A1* | 8/2017 | Oki | | H02J 50/90 |
| 2017/0310232 A1* | 10/2017 | De Hoog | | H02M 5/42 |

FOREIGN PATENT DOCUMENTS

| | | |
|---|---|---|
| CN | 104682573 A | 6/2015 |
| CN | 107534321 A | 1/2018 |
| WO | 2015060781 A1 | 4/2015 |
| WO | 2017112054 A1 | 6/2017 |

OTHER PUBLICATIONS

International Search Report and Written Opinion for related PCT Application Serial No. PCT/US2016/057386 with a file date of Oct. 16, 2016 and dated Jan. 20, 2017, 3 pages.

Chinese Search Report for related Chinese patent Application CN2016110254094 dated Mar. 2, 2018, 1 page.

* cited by examiner

300A

400B

400C

500

1000

1200

WIRELESS CHARGING COIL PLACEMENT FOR REDUCED FIELD EXPOSURE

BACKGROUND ART

Electronic devices are often powered by an internal battery that generally requires re-charging of the battery. Wireless charging platforms can charge the battery in the receiving electronic device by electromagnetically coupling the current flowing in the transmitting coil with the receiving coil, where the receiving coil is part of the receiving electronic device. This charging radiation resulting from the electromagnetic coupling may also be the source of excess magnetic fields that can radiate into the surrounding environment, potentially causing impactful radiation exposure to humans near the wireless charging platform.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1:
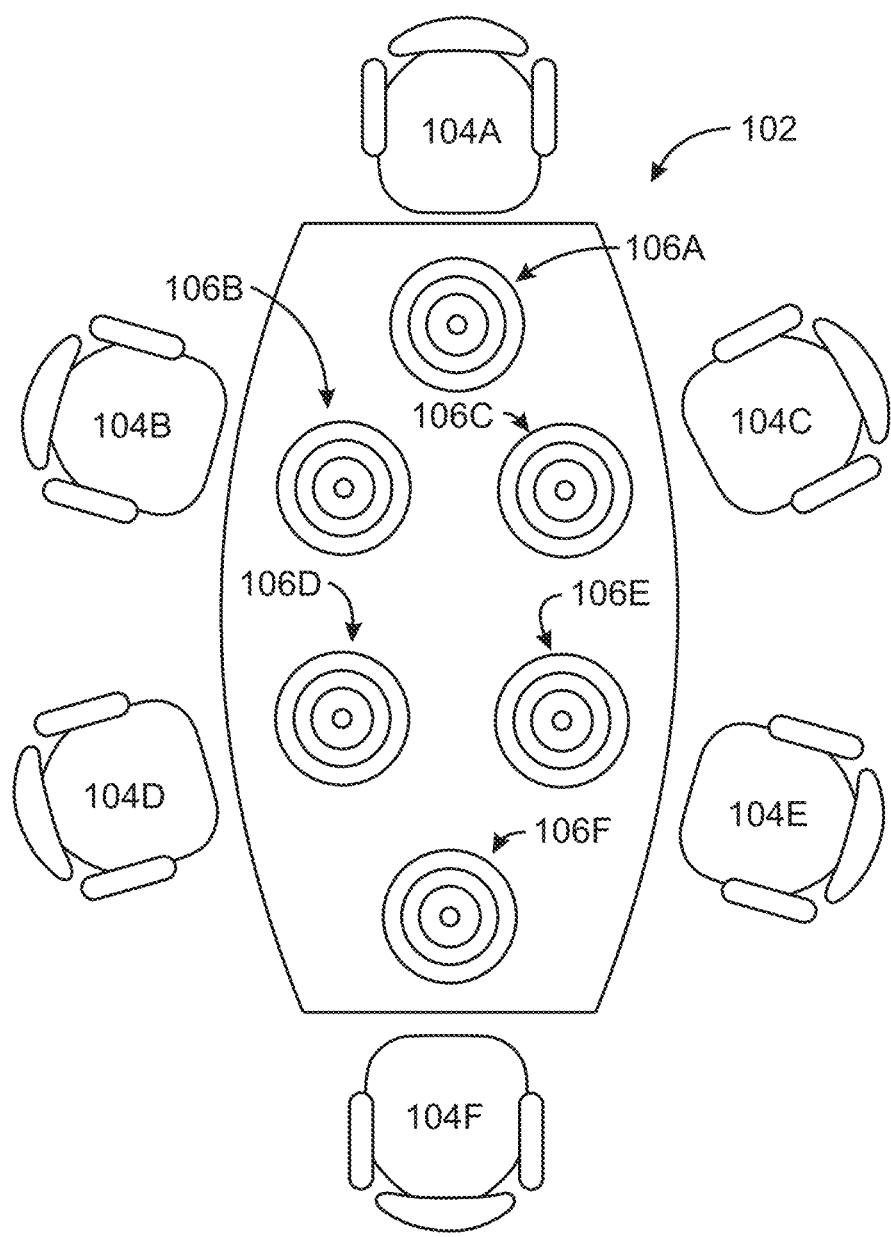
FIG. 1 is a top view of a wireless charging system.

Wireless charging may be achieved by embedding the wireless charging functionality into various furnishings, including furniture such as tables, chairs, bookcases, desks, chests, hutches, beds, and couches, among others. Additionally, wireless charging functionality may be embedded in various appliances. By embedding wireless charging into everyday objects, the user experience is expanded by enabling easy access to power for the electronic devices. One of the principal components in a wireless charging system is a power transmit unit (PTU) that powers a power receive unit (PRU) of the electronic device through resonant inductive coupling. In some cases, the resonant inductive coupling between the PTU and PRU also leads to magnetic fields that are "leaked" from the charging radiation and radiated into air, resulting in a risk of causing impactful radiation exposure to humans using the furniture or appliance.

Embodiments described herein provide an active shielding coil that is to minimize the potentially harmful magnetic field superimposed between the PTU and the PRU. Additionally, in embodiments, the PTU is placed within the furniture such that localized field exposure is minimized. For ease of description, the PTU and PRU are described as being located within various objects and devices. However, the present techniques can be used with any object and device that implements wireless charging.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments. Elements or aspects from an embodiment can be combined with elements or aspects of another embodiment.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

FIG. 1 is a top view of a wireless charging system 100. The wireless charging system 100 includes a table 102 and a plurality of chairs 104A, 104B, 104C, 104D, 104E, and 104F. In embodiments, the table 102 may be a conference room table in an office set-up. In embodiments, the table 102 is a dining room table developed for home or commercial use.

Wireless charging is a result of resonant inductive coupling where electrical energy is transmitted between two magnetically coupled coils that are each a part of resonant circuits that have been tuned to resonate at the same frequency. In embodiments, a transmitter coil in one device transmits a charging radiation across an intervening space to a resonant receiver coil in another device. In this manner, electronic devices can be charged without a physical coupling to an electrical outlet.

In some cases, resonant electric power transfer is accomplished by making a coil ring with an oscillating current to generate an oscillating magnetic field. Because the coil is highly resonant, any energy placed in the coil dies away relatively slowly over very many cycles; but if a second coil is brought near it, the second coil can pick up most of the energy before it is lost, even if it is some distance away. As used herein, the coil may be any electrical conductor in the shape of a coil, spiral or helix capable of enabling the transmission or current.

The table 102 includes a plurality of power transmit units (PTUs) 106A, 106B, 106C, 106D, 106E, and 106F embedded into the surface of the table 102. Each PTU consists of a coil that carries current to create the magnetic field used for wireless charging. While the PTUs 106A, 106B, 106C, 106D, 106E, and 106F are illustrated as corresponding to each of the chairs 104A, 104B, 104C, 104D, 104E, and 104F, any number of chairs and PTUs may be used. The PTU may consist of a coil and associated electronic circuitry that drives current into the PTU creating a resonant inductive coupling with a nearby PRU coil. This coupling induces current in the PRU that in turn powers a battery or device coupled with the PRU.

In embodiments, the PTUs 106A, 106B, 106C, 106D, 106E, and 106F are positioned within the top of table 102 such that the limits for the magnetic field as prescribed by a regulatory agency are maintained. For example, in the United States, the Federal Communications Commission (FCC) recommends a reference limit for a magnetic field at 6.78 MHz is of 0.32 A/m. In examples, the location of PTUs 106A, 106B, 106C, 106D, 106E, and 106F is optimized according to an algorithm for coil placement.

Figure 2:
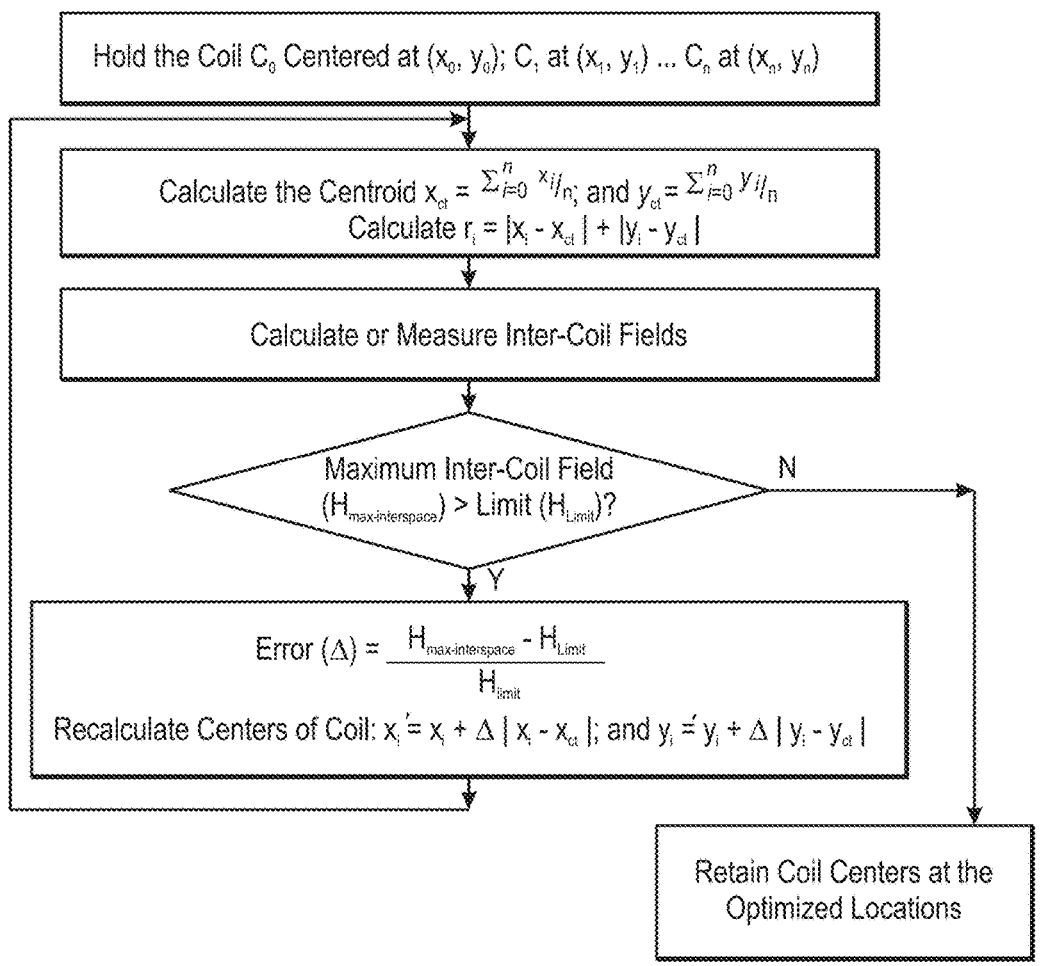
FIG. 2 is a process flow diagram of a method for optimal coil placement.

FIG. 2 is a process flow diagram of a method 200 for optimal coil placement. The locations for coil placement in the presence of multiple coils in settings such as a classroom, an office conference table, a dining table, etc. are found through an algorithmic procedure that is to minimize field levels in the regions between coils below the requisite limits. The locations and positional distance of PTU coils between each other is dictated by an exponential decay model of the radiated leakage magnetic field, which will be further described below. The exponential decay model is constructed by curve-fitting the measured leakage magnetic field decay radiated from the PTU in the peripheral direction. The constructed exponential decay model is then used to estimate and guide an optimization process for minimizing the superimposed electromagnetic radiation exposure to humans from one or multiple coils installed in furniture used in an office or home setting. The optimization process yields a location for coil in the furniture that results in minimal hazardous radiation exposure to human subjects using the furniture. As used herein, the superimposed electromagnetic field refers to any leaked or excess field that can potentially cause harm to humans near the field.

For ease of description, the coils are described as being integrated with the surface or top of a table. However, the present techniques may be applied to any item of furniture or any appliance. At block 202, each coil is centered at an initial location. For example coil $c_0$ may be centered at location $(x_0, y_0)$; coil $c_1$ may be centered at location $(x_1, y_1)$, up to a through a coil $c_n$, which may be centered at a location $(x_n, y_n)$. In embodiments, the initial location of the coil may be determined by prescribed design goals or a pre-determined distance between each coil.

At block 204, the centroid $(x_{ct}, y_{ct})$ of the table top is determined, and a distance $(d_i)$ of between the centroid and the center of each coil is determined. As used herein, the centroid of a surface refers to an average position of all coil locations on the surface. In examples, the centroid may be calculated by the following equation:

$$x_{ct} = \frac{\sum_{i=0}^{n} x_i}{n}, \quad y_{ct} = \frac{\sum_{i=0}^{n} y_i}{n}$$

Additionally, the distance $d_i$ may be computed using the following equation:

$$d_i = |x_i - x_{ct}| + |y_i - y_{ct}|$$

where i refers to the ith coil. In this manner, the coils are located at a position that is a prescribed distance from the centroid of the table top.

At block 206, the inter-coil magnetic fields ($H_i$) are calculated or measured. In examples, the inter-coil magnetic fields may be dependent on the distance (where field is calculated), coil current, and size of PTU coil. Additionally, the magnetic fields may be calculated based on the current through the coil, the size of the coil, and the location of the coil within the surface of the table. At block 208, a maximum inter-coil magnetic field ($H_{max-interspace}$) is determined for each coil. The maximum inter-coil magnetic field ($H_{max-interspace}$) describes the potential for a leaked magnetic field between a number of coils, and is compared with the magnetic field limit ($H_{Limit}$). The magnetic field limit ($H_{Limit}$) may be an upper limit that magnetic fields are to not exceed as prescribed, for example, by a regulatory body. If the maximum inter-coil magnetic field ($H_{max-interspace}$) is less than the magnetic field limit ($H_{Limit}$), process flow continues to block 210. If the maximum inter-coil magnetic field ($H_{max-interspace}$) is greater than the magnetic field limit ($H_{Limit}$), process flow continues to block 212.

At block 210, the coil center location is maintained at the present location. At block 212, an error value ($\Delta$) is calculated according to the following equation:

$$\text{Error}(\Delta) = \frac{H_{max-interspace} - H_{Limit}}{H_{Limit}}$$

Using the calculated error, the center of each coil is recalculated according to the following equations:

$$x_i' = x_i + \Delta|x_i - x_{ct}|, \ y_i' = y_i + \Delta|y_i - y_{ct}|$$

Process flow then returns to block 204, where the centroid ($x_{ct}$, $y_{ct}$) of the table top is recalculated using the new coil center ($x_i'$, $y_i'$) for each coil. Additionally, the distance ($d_i$) of between the centroid and the center of each coil is recalculated. These calculations are computed in an iterative fashion until the maximum inter-coil magnetic field ($H_{max-interspace}$) is less than the magnetic field limit ($H_{Limit}$).

In this manner, wireless charging coils (also referred to as power transmit units (PTUs)) used for charging phones, phablets, tablets and PCs can be integrated into furniture that reduces radio frequency (RF) electromagnetic field exposure to people (human subjects) using this furniture while the installed PTU is actively charging a power receiving unit (PRU) (e.g. phone, laptop, etc.). The furniture targeted for safe installation of PTU are those commonly used in offices and homes such as a conference table, an office cubicle, a coffee table, and a class room. The wireless charging PTU coil is placed in furniture such that the localized field exposure is minimized.

Figure 3A:
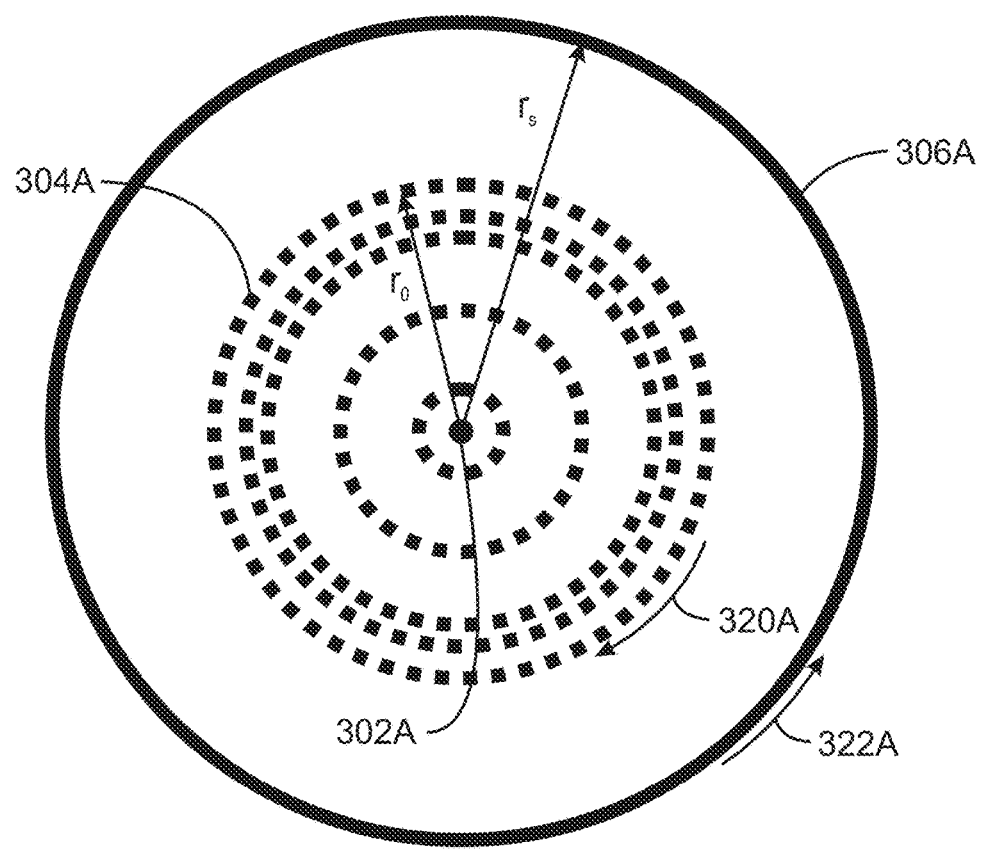
FIG. 3A is an illustration of a PTU coil with an active shielding coil.

The superimposed field between two coils may also be minimized through the use of an active shielding coil, while not adversely impacting the charging rate of the PRU. The wireless charging PTU coils with active shield coils are placed in furniture such that the radiated leakage magnetic field is reduced below the required exposure limits for human users. FIG. 3A is an illustration of a PTU coil 300A with an active shielding coil. The PTU coil is located at a center 302A. The PTU coil 300 includes a set of primary turns 304A which are located at various distances from the center to a radius of $r_0$. The PTU coil 300A also includes a shielding turn 306A, which is located at a distance from the center 302A at a radius of $r_S$. The active shielding coil is incorporated around the main windings or primary turns 304A of the PTU coil 300A, and carries current in a direction opposite to the main windings which leads to opposing fields outside the PTU, thereby significantly reducing the effective field outside the PTU. As used herein, primary turns refers to the primary coils or main windings of the PTU that are used to create a magnetic field for wireless charging. Additionally, the shielding turn refers to one or more additional coils or windings that are used to mitigate excess radiation from the primary turns. The shielding turn is active as it carries a current.

In embodiments, the PTU may enter a lower power beacon mode when a PRU is not within a pre-defined region that encompasses the PTU. The beacon mode includes the emission of a beacon signal or current that is emitted from the PTU and is lower than an active charging current emitted by the PTU. Through the use of a beacon mode, power consumption of the PTU when not in use is reduced. Moreover, any potential magnetic field interference with other devices in eliminated in the beacon mode. When a PRU enters the pre-defined region, the PTU may exit the beacon mode and transition to a higher powered state that is able to charge a receiving device wirelessly via the PRU. The higher power state is one where the PTU is fully powered and can emit an active charging current based on an electromagnetic field produced by current through the PTU.

In embodiments, the current of the active shielding coil may be independent of the primary coils and can transmit current of a different magnitude when compared to the current transmitted by the primary coils. This enables the current of the active shielding coil to be adjusted independently of the current through the primary coils. In this manner, the magnitude of the active charging current received by the PRU of a receiving device can be fine-tuned though current adjustments applied to each of the primary coils and the active shielding coil. A feedback mechanism can be used to adjust the active charging current based on various factors, such as a power level of the receiving device, a magnetic field leakage as the receiving device is powered, other sources of magnetic field interference, and the like. In embodiments, the feedback mechanism may be implemented via an electrical feedback loop between the PTU and the PRU. For example, a positive feedback can be used to indicate the receiving device is fully charged, while a negative feedback can indicate the need for additional charging. The positive and negative feedback have been described for exemplary purposes only, and any type of electrical feedback can be implemented.

The feedback mechanism may also be software based. In a software based feedback loop, software of the PTU and/or the receiving device can use another communication channel to transmit information related to charging the receiving device. For example, Bluetooth or WiFi communications may be used to transmit information related to the power level of the receiving device, magnetic field leakage as the receiving device is powered, other sources of magnetic field interference, and the like. Blue tooth communications may be based on the Bluetooth standard promulgated by the Bluetooth Special Interest Group. WiFi communication may be based on WiFi standards (standards promulgated as Institute of Electrical and Electronics Engineers' (IEEE) 802.11 standards). Each of the electronic and software feedback mechanisms enable a PTU to emit an active charging current only when the receiving device is present or when the receiving device is present and needs to be charged. Moreover, the feedback mechanism can enable the PTU to halt any active charging current when the receiving device is fully charged or removed from a pre-defined region that encompasses the PTU. The active charging current can be used to charge the receiving device in a dynamic fashion, where the power supplied to the receiving device is dynamically adjusted based on various factors described above.

Previous solutions typically use input current into the PTU as a control knob to limit radiated magnetic fields from exceeding limits that are considered safe for human exposure. That is, the input current into the PTU is reduced to decrease the radiated leakage magnetic field. The present techniques do not require any change in the current supplied into the coil. Instead, the active shielding coil carries current in a direction opposite to the main windings to reduce a magnetic field in a region between the multiple PTUs through active cancellation of fields. Additionally, as described above, the location for coil placement in the furniture may be determined through an algorithmic procedure with or without an active shielding coil, ensuring that the field exposure to people using the furniture can be reduced below the limit that is lower than safe exposure limits.

Figure 3B:
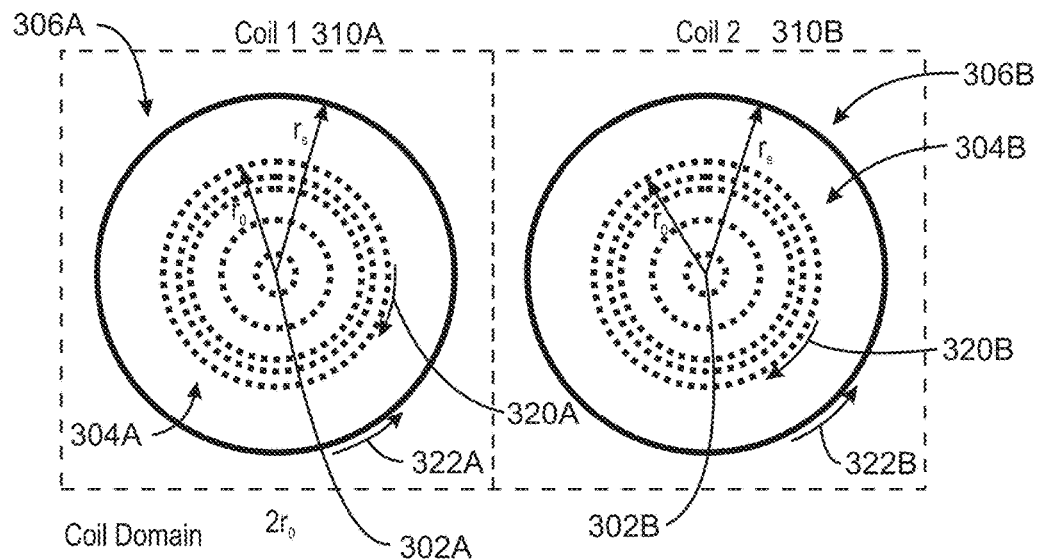
FIG. 3B is an illustration of a plurality of PTU coils with active shielding coils.

FIG. 3B is an illustration of a plurality of PTU coils 300B with active shielding coils. A PTU coil 310A is located at a center 302A. A PTU coil 310B is located at a center 302B. The PTU coil 310A includes a set of primary turns 304A which are located at various distances from the center to a radius of $r_0$. Similarly, the PTU coil 310B includes a set of primary turns 304B which are located at various distances from the center to a radius of $r_0$. Note that the direction of current indicated by the arrow at 320A and 320B in the primary turns 304A and 304B is opposite to that in the shielding turn current direction indicated by the arrows at 322A and 322B. The PTU coil 310A also includes a shielding turn 306A, which is located at a distance from the center 302A at a radius of $r_S$. Similarly, the PTU coil 310B also includes a shielding turn 306B, which is located at a distance from the center 302B at a radius of $r_S$.

In embodiments, the PTU coils 310A and 310B are each placed according to an algorithm, such as the algorithm described in FIG. 2. In this manner, the coils can satisfy any regulatory limits placed on the emission of a magnetic field. Moreover, the shielding coil may further limits placed of the emission of a magnetic field by the charging coils. Typical solutions use the input current into the PTU for reducing the leakage fields from exceeding the limits for human safety. However, the same current is responsible for transfer of power into the PRU. As a result, if the input current into the PTU is reduced, then the coupled power into the PRU also decreases leading to a low power transfer that cannot power higher power rated devices that work on a higher rated power level.

The coil 310A and the coil 310 are not subject to any change in the input current used for excitation at the PTU. Instead, the radiated hazardous field is limited through at least one active shielding turn, such as the shielding turn 306A or the shielding turn 306B, which ensures a uniform field distribution for the primary PRU, but guarantees low a magnetic field in the space between the two neighboring PTU coils. In this manner, the present techniques minimize exposure to humans operating in or around the table including PTUs.

As an example, consider a coil domain that includes primary turns for charging and one shielding turn opposite current direction with that of primary turns. In this example, the position of the shielding turn will be optimized inside coil domain to mitigate the interference between two coils.

An exemplary first coil 310A may have primary turns 304A located at $r_5$=4.2 cm, $r_4$=6.9 cm, $r_3$=8.5 cm, $r_2$=9 cm, $r_1$=9.5 cm, and $r_0$=10 cm, with a driving current of I=1.2 A. The charging surface, such as a table top, may have a depth of z=11 mm. Each primary turn 304A of the coil 310A has a distance from the center 302A of the coil 310A represented by $r_{PT}$, where PT represents the $PT^{th}$ turn of the primary turns 304A. The shielding turn 306A has a distance from the center 302A of the first coil 310A represented by $r_S$, and $r_S$ is a member of a set between $r_0$ and $2r_0$, such that $$r_S \in (r_0, 2r_0)$$

The location of the shielding turn 306A $r_S$ of the first coil 310A may be positioned such that the total magnetic field ($H_Z$) from the first coil 310A is minimized in a location of a second coil 310B, such that $$a \in (3r_0, 5r_0)$$

wherein a is an area or region where the primary turns 304B of a second coil 310B are located. In other words, the present techniques minimize the total $H_Z$ resulting from a first coil 310A:

$$H_Z = H_{Z\text{-}primary} + H_{Z\text{-}shielding}$$

The total $H_Z$ is minimized in an area or region represented by $(3r_0, 5r_0)$, where a second coil 310B may be present. Note that the second coil may or may not include an active shielding coil.

Figure 4A:
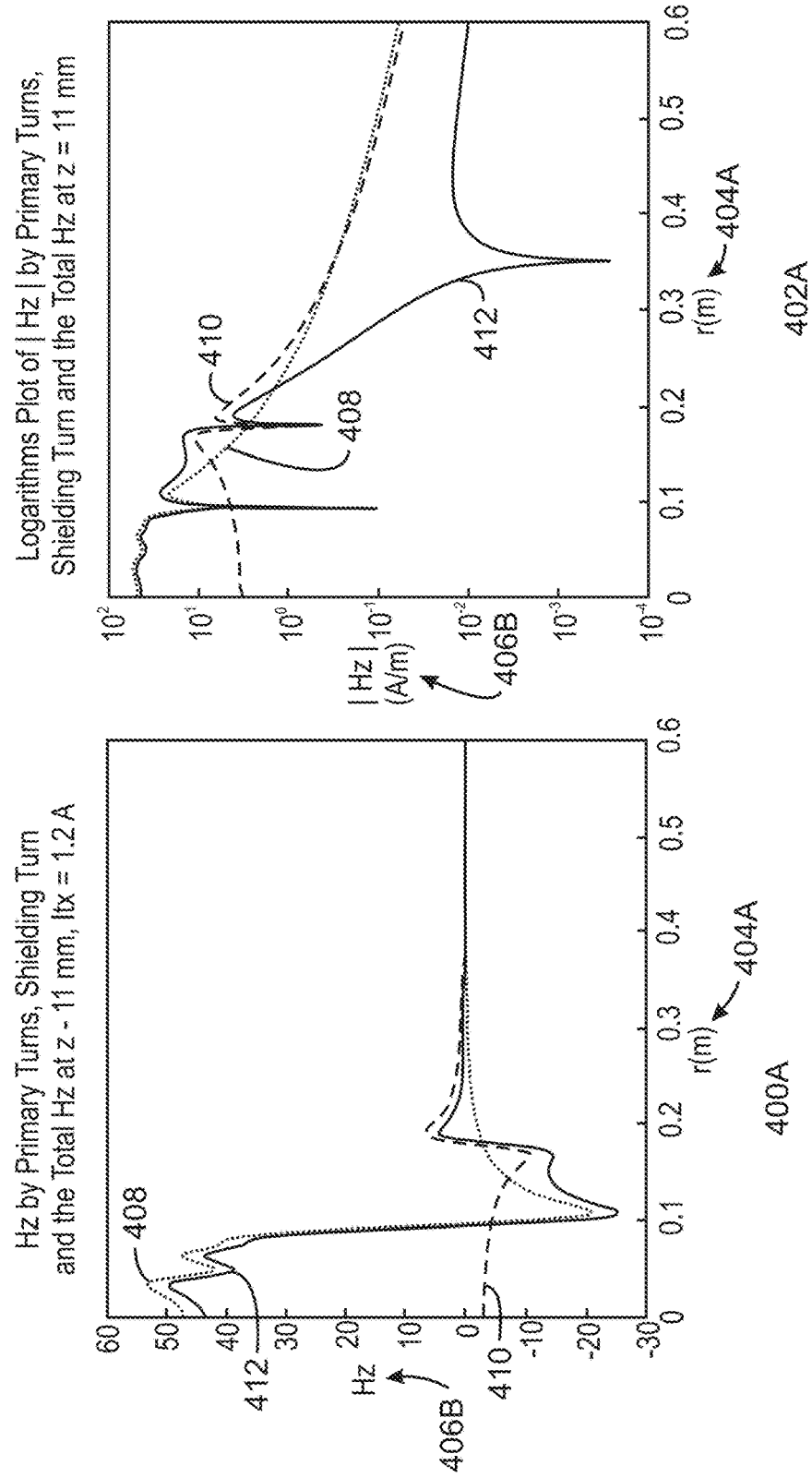
FIG. 4A is a line graph and a logarithmic plot that represents the magnetic field of the primary turn, shielding turn, and total of the previous example.

FIG. 4A is a line graph 400A and a logarithmic plot 402A that represents the magnetic field of the primary turn, shielding turn, and total of the previous example. Each x-axis 404A represents a radius, in meters, while each y-axis 406B represents a magnetic field strength H. The dotted line 408 on each of the graph 400A and the plot 402A represents the magnetic strength of the primary turns. The dashed line 410 on each of the graph 400A and the plot 402A represents the magnetic strength of the shielding turn. Additionally, the solid line 412 on the graph 400A and the plot 402A represents the total magnetic strength, including both the primary turns and the shielding turn.

In the present example, positioning the shielding coil at approximately $r_S$=17.7 cm results in an average total $H_Z$ in $a \in (3r_0, 5r_0)$ of approximately 0.0151 A/m. Prior to shielding, the average total $H_Z$ in $a \in (3r_0, 5r_0)$ is approximately 0.233 A/m. Thus, the contribution of magnetic field from the shielding turn reduces the total magnetic field by approximately 0.2179 A/m. The resulting magnetic field of approximately 0.0151 A/m is well within limits prescribed by the FCC. The FCC recommended reference limit for magnetic field at 6.78 MHz is 0.32 A/m, the optimized shielding turn is able to compress "high exposure bubble" (H>0.32 A/m) to a smaller one, which reducing the EM exposure risks in the region close to the coil.

Figure 4B:
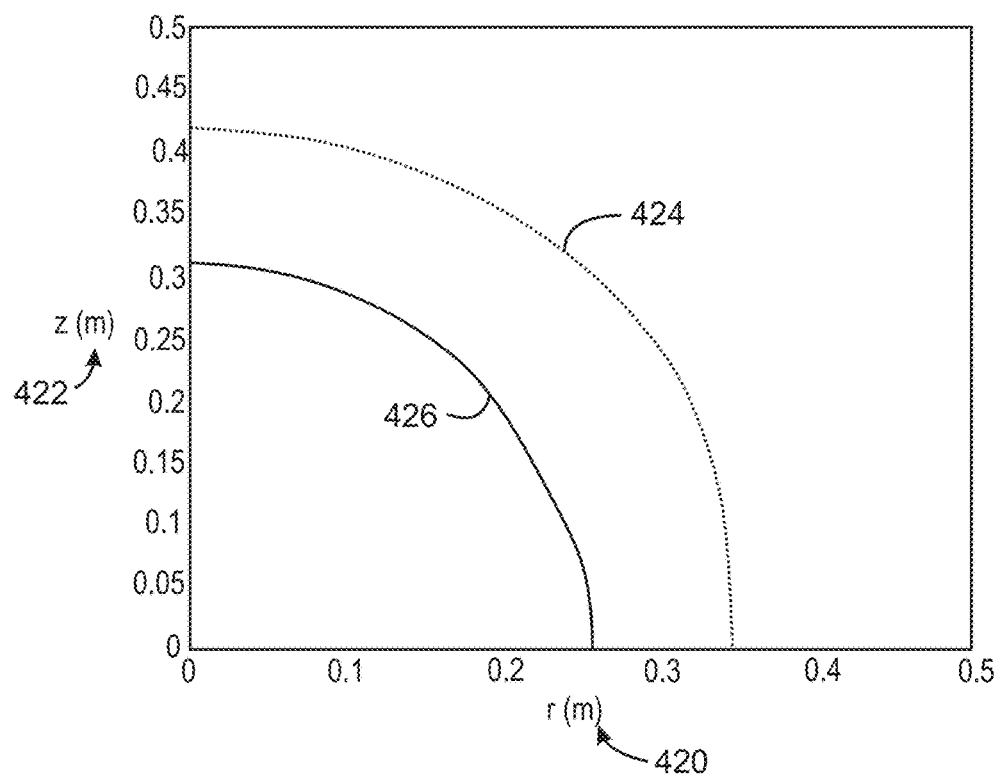
FIG. 4B is a plot of magnetic field isolines, with and without shielding.

FIG. 4B is a plot of magnetic field isolines 400B, with and without shielding. As used herein, the isolines describe lines in the space of a constant magnetic field. The x-axis 420 represents a radius, in meters, while the y-axis 422 represents a z distance from the surface, in meters. The dotted line 424 on the graph 400B represents the FCC magnetic field strength limit. The dashed line 426 on the graph 400B represents the magnetic field strength of the PTU with a shielding turn. As illustrated in FIG. 4B, the use of active shielding improves the minimum distance of compliance to FCC reference field limit by 28% in the plane of the coil and by 22% in the vertical plane (orthogonal to plane of the coil).

Figure 4C:
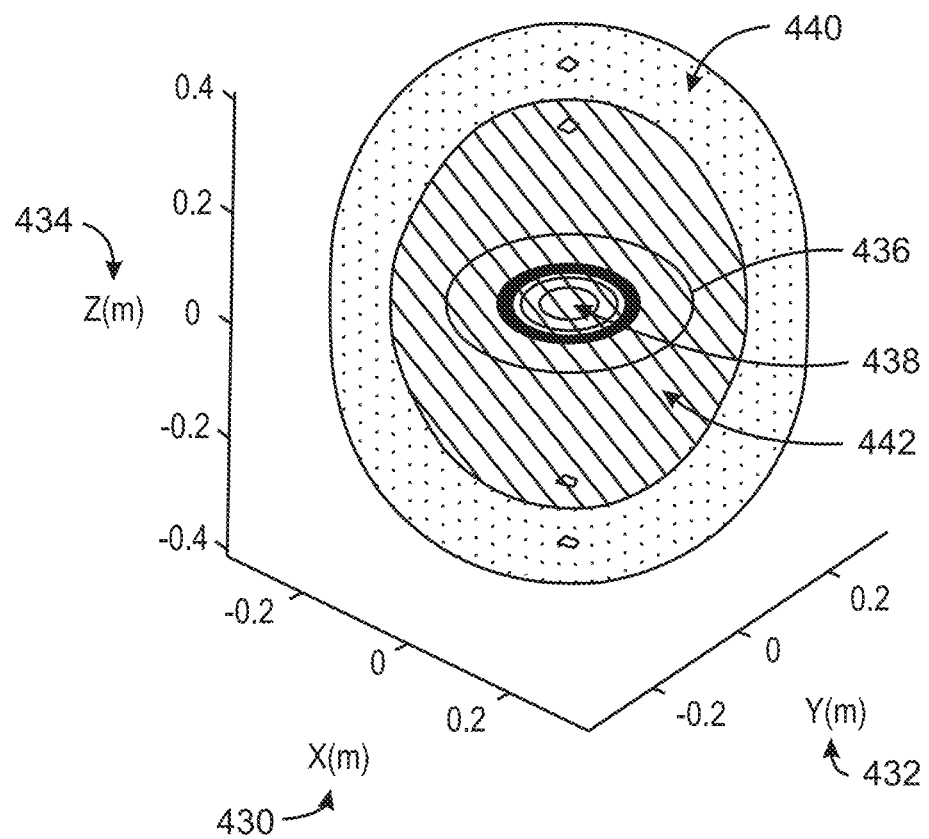
FIG. 4C is an illustration of an isosurface, with and without shielding.

FIG. 4C is an illustration of an isosurface 400C, with and without shielding. As used herein, the isosurface describes a surface in the space of a constant magnetic field. The x-axis 430 represents a distance, in meters, the y-axis 432 represents a distance, in meters, and the z-axis 434 represents a distance, in meters. A PTU 436 is illustrated with a center 438. The dotted volume 440 on the graph 400C represents the FCC magnetic field strength limit. The lined volume 442 on the graph 400C represents the magnetic field strength of the PTU 436. FIG. 4C illustrates the same magnetic field reduction as FIG. 4B, using the isosurface of the magnetic fields, with and without shielding. The volume enclosed by the isosurface with shielding is smaller than without shielding, thereby providing more user freedom for movement and easier labeling requirements.

The present techniques were verified via open-circuit transfer impedance parameters, or Z-parameters in a two-port network. The port as described herein refers to electrical terminals carrying a current. The relationship between port currents and voltages are as follows:

$$\begin{pmatrix} V_1 \\ V_2 \end{pmatrix} = \begin{pmatrix} Z_{11} & Z_{12} \\ Z_{21} & Z_{22} \end{pmatrix} \begin{pmatrix} I_1 \\ I_2 \end{pmatrix}$$

where $$Z_{21} = \frac{V_2}{I_1}\bigg|_{I_2=0} = i\omega * M_{21}$$

The $Z_{21}$ parameter of the previous example was measured on a Vector Network Analyzer (VNA) by using a smaller receiver to measure the $Z_{21}$ parameter between the transmitter and receiver. A reduction in the $Z_{21}$ parameter at the same distance with a shielding coil present helps in experimentally verifying the analytical conclusions reached above.

Figure 5:
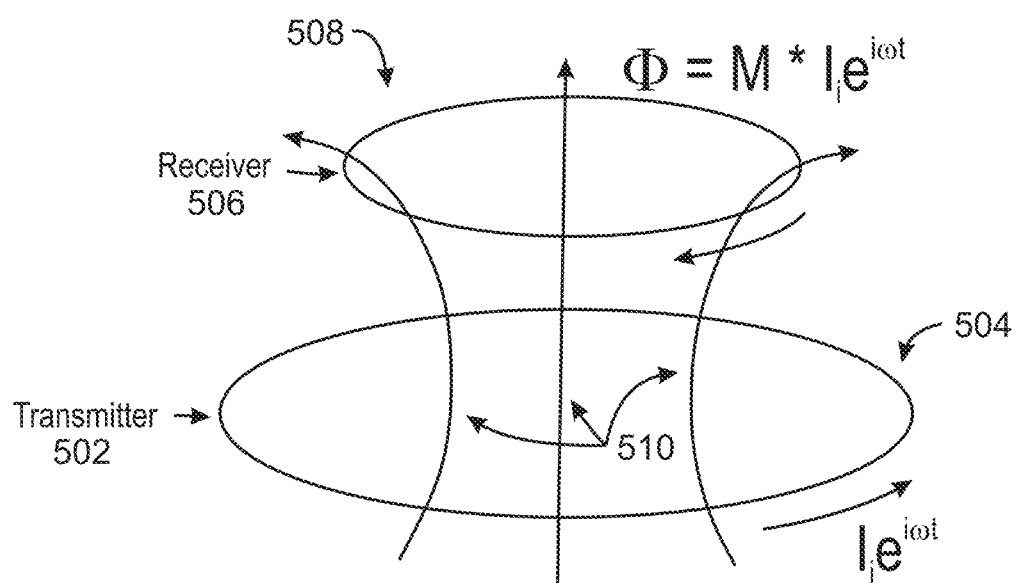
FIG. 5 is an illustration of the coupling between transmit coils and receive coils.

FIG. 5 is an illustration of the coupling 410 between transmit coils 502 and receive coils 506 as quantified by the $Z_{21}$ parameter. Since the magnetic flux $\phi \propto M_{21}$ for unit current and $Z_{21}=\omega*M_{21}$ so we have $\phi \propto Z_{21}$. If the receiver is small, in which case, $\phi \approx \mu_0 H \cdot N \cdot S$ where N and S are the number of turns and area of the smaller receiver coil, hence $Z_{21}$ is proportional to magnetic field.

The $Z_{21}$ scanning may be performed at 1.71 MHz, from the coil center to approximately 40 cm away from the center. Additionally, the receiver may be a 4-turn small square coil placed 11 mm above the transmitting coil surface.

The transmitter coil 510 is used in the magnetic coupling, with a current as described by the below equation:

$$I_1 e^{i\omega t}$$

Wherein $I_1$ represents the current through the first coil, and $\omega$ is the angular frequency of the oscillating current.

The receiver 506 is charged by a coupling 510, resulting in a magnetic flux as defined by the following equation:

$$\Phi = M * I_1 e^{i\omega t}$$

Wherein $\Phi$ represents the magnetic flux, M represents the magnetization in ampere per meter (A/m).

Figure 6:
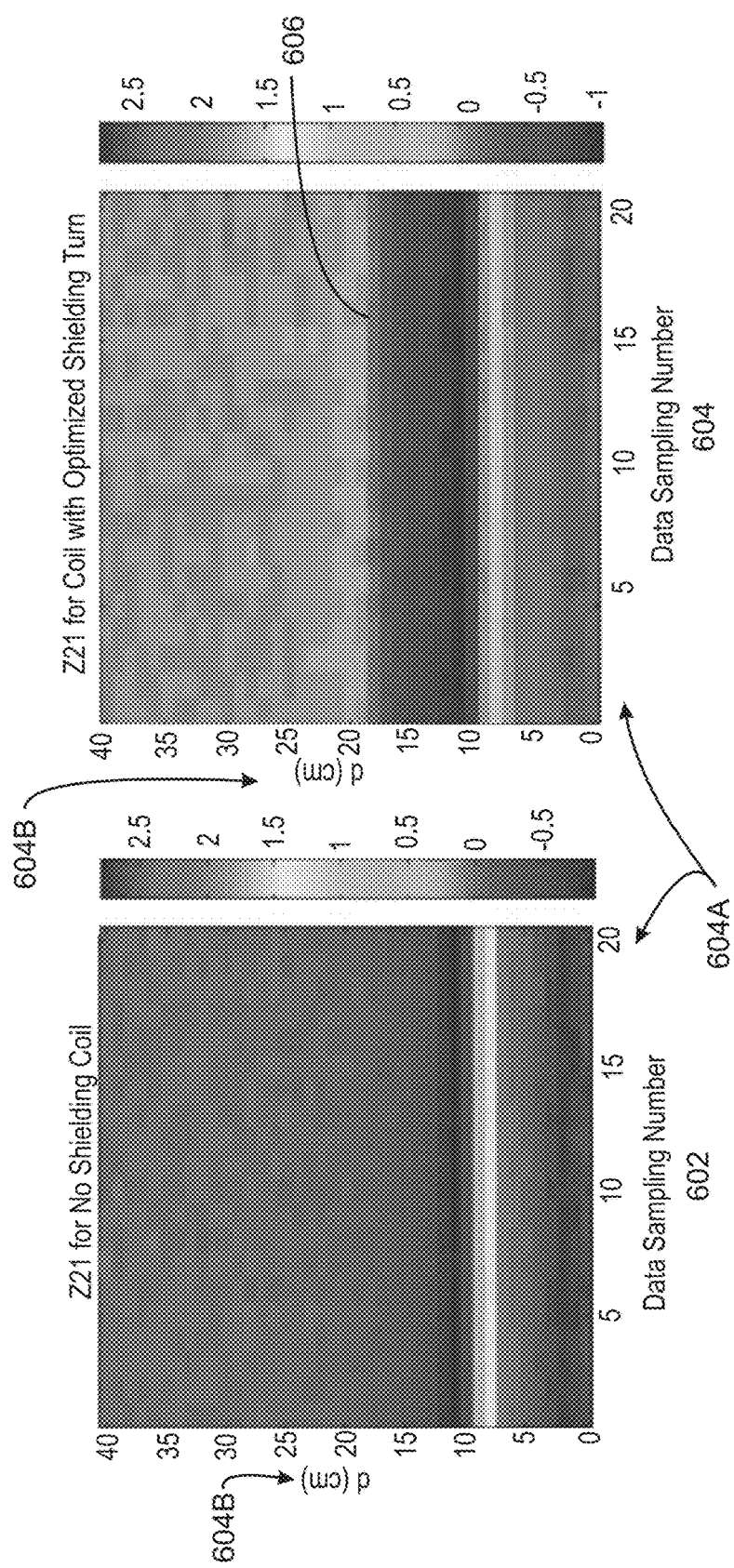
FIG. 6 is an illustration of the $Z_{21}$ scanning result.

FIG. 6 is an illustration of the $Z_{21}$ scanning result. As illustrated, without shielding at 602 and with shielding at 604. Without shielding the magnetic field gradually fades as distance from the coil center increases. However, with shielding, the magnetic field experiences an immediate attenuation around 17-18 cm from the center of the coil at reference number 606.

Figure 7:
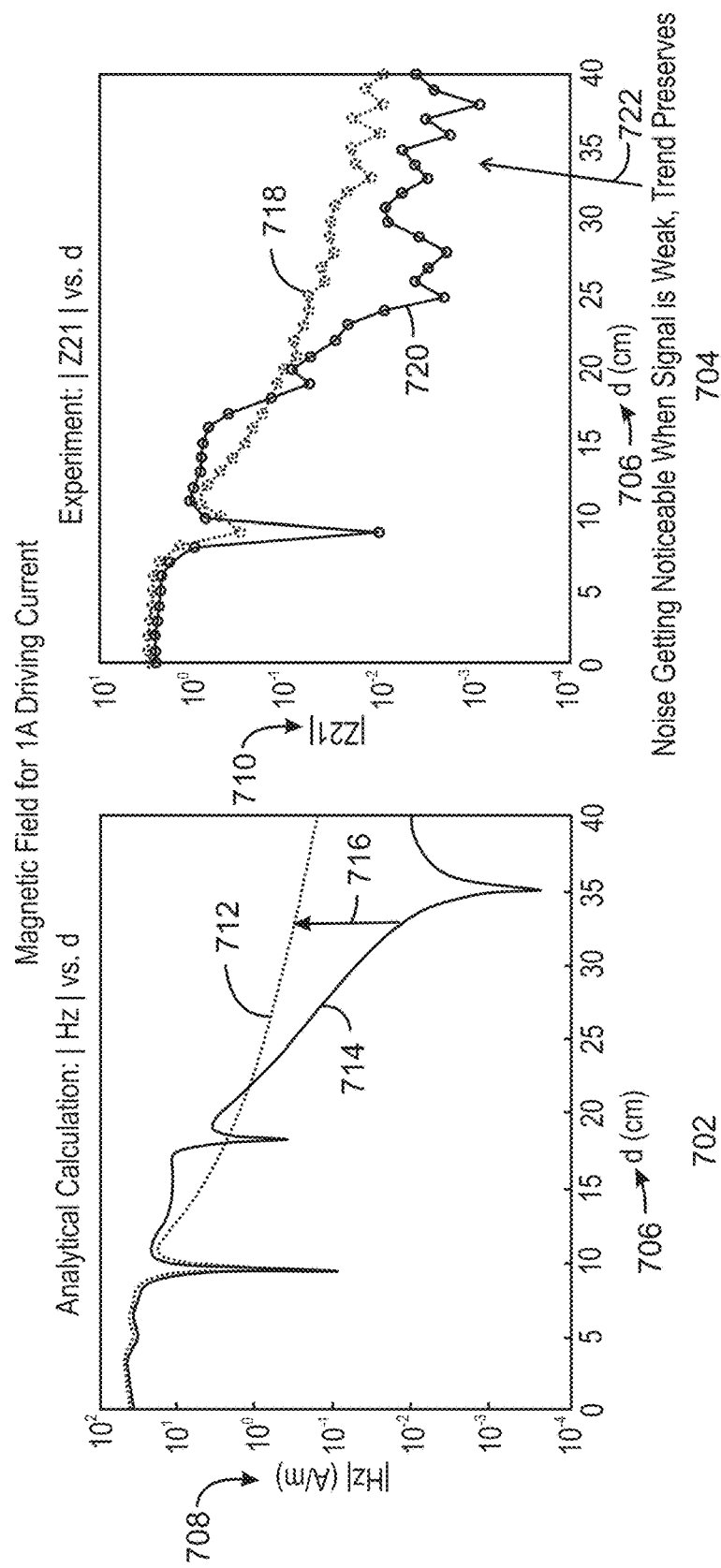
FIG. 7 illustrates the magnitude of magnetic field with and without shielding.

FIG. 7 illustrates the magnitude of magnetic field with and without shielding. The calculation is illustrated at graph 702, while the measured magnetic field is illustrated at graph 704. The x-axis of both graph 702 and 704 represent a distance in centimeters. The y-axis of graph 702 represents the calculated magnetic field strength, while the y-axis of graph 704 indicates the calculated $Z_{21}$ parameter. Note that the $Z_{21}$ is a direct proxy for the magnetic field as described. The dotted line 712 of graph 702 represents the magnetic field with no shielding turn, and the solid line 714 of graph 702 represents the magnetic field strength with a shielding turn. The arrow 716 illustrates an approximate ten-fold reduction in magnetic field strength with active shielding. Similarly, the dotted line 718 of graph 704 represents the $Z_{21}$ parameter with no shielding turn, and the solid line 720 of graph 704 represents the $Z_{21}$ parameter with a shielding turn. The arrow 722 illustrates the same trend as graph 702, namely a reduction in magnetic field strength with active shielding.

Several exemplary scenarios are described, such as a living room center table with two coils, a conference room table, and a class room that show the field distribution without and with the proposed active shielding. In each case, the field distribution is considerably improved in the region between the coils. The resulting field in the inter-coil region meets the field exposure requirements.

Figure 8:
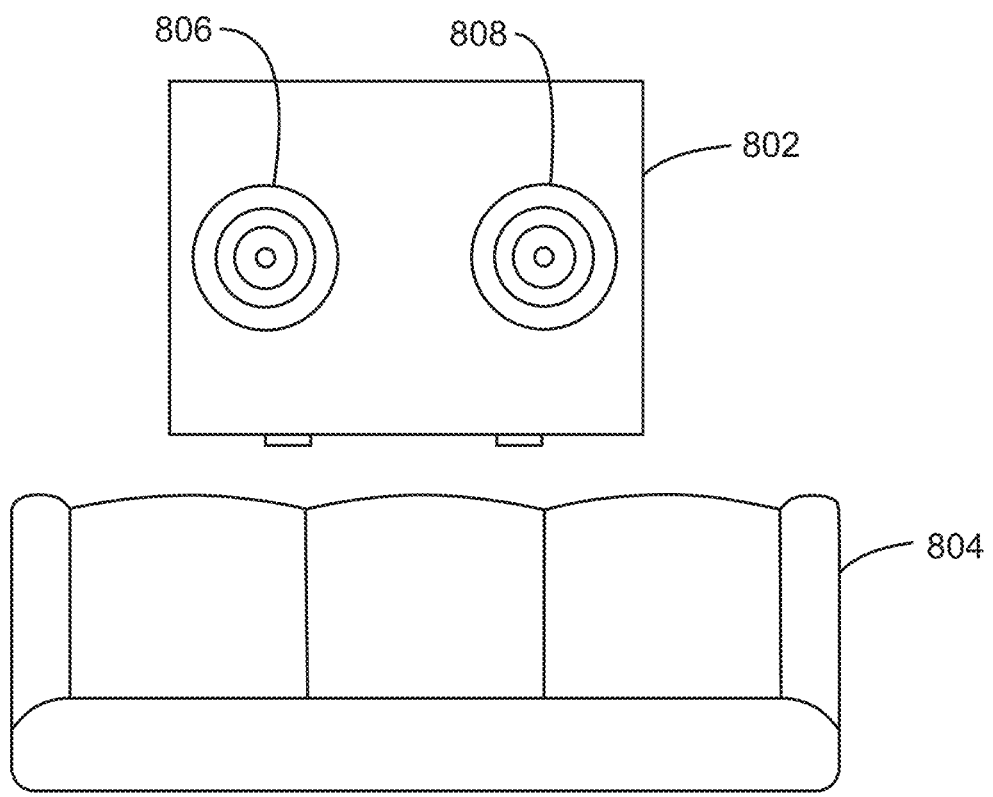
FIG. 8 is an illustration of a room that includes a table and sofa.
Figure 9:
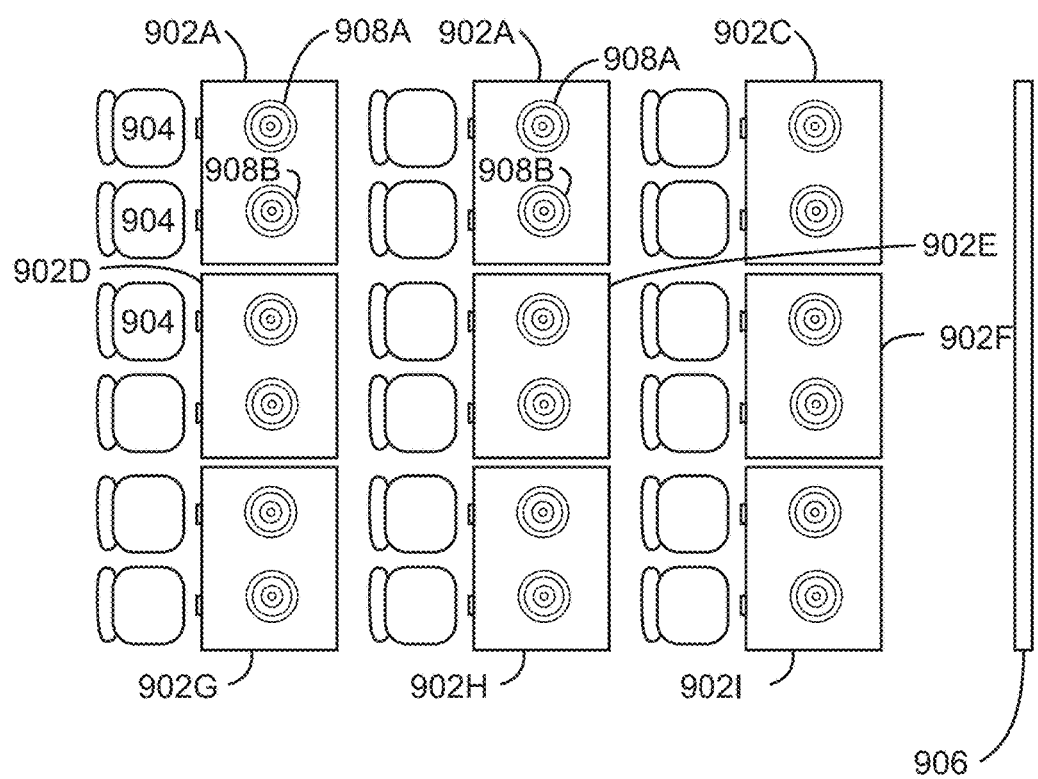
FIG. 9 is an illustration of a room that includes a plurality of tables and a plurality of chairs.

FIG. 8 is an illustration of a room 800 that includes a table 802 and sofa 804. The table 802 may include a plurality of charging coils, such as the charging coils 806 and 808. Similarly, FIG. 9 is an illustration of a room 900 that includes a plurality of tables 902 and a plurality of chairs 904. The tables, for example, may be 902A, 902B, 902C, 902D, 902E, 902F, 902G, 902H, and 902I. The tables 902 and the chairs 904 may face a centralized board 906. In embodiments, the centralized board is a white board or chalk board. Additionally, in embodiments the room 900 is a classroom or lecture hall. Each table 902A, 902B, 902C, 902D, 902E, 902F, 902G, 902H, and 902I include a plurality of charging coils, such as the charging coils 908A and 908B.

Figure 10:
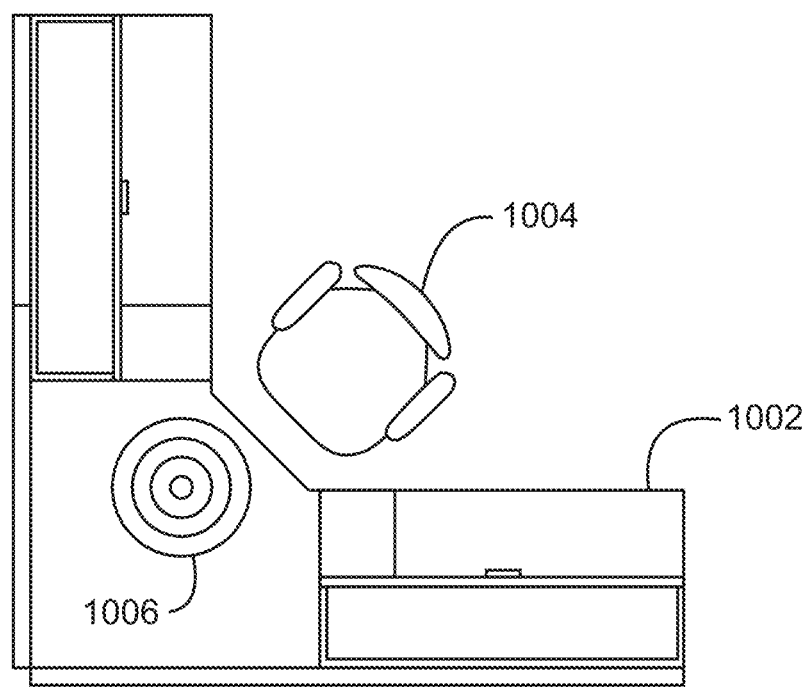
FIG. 10 is an illustration of a room that includes a table and chair.

FIG. 10 is an illustration of a room 1000 that includes a table 1002 and chair 1004. The table 1006 may include a plurality of charging coils, such as the charging coil 1006. Although one charging coil is illustrated the table 1002 may include a plurality of charging coils. Moreover, the table 1002 may be a work table, such as a piece of furniture in an office building.

Figure 11:
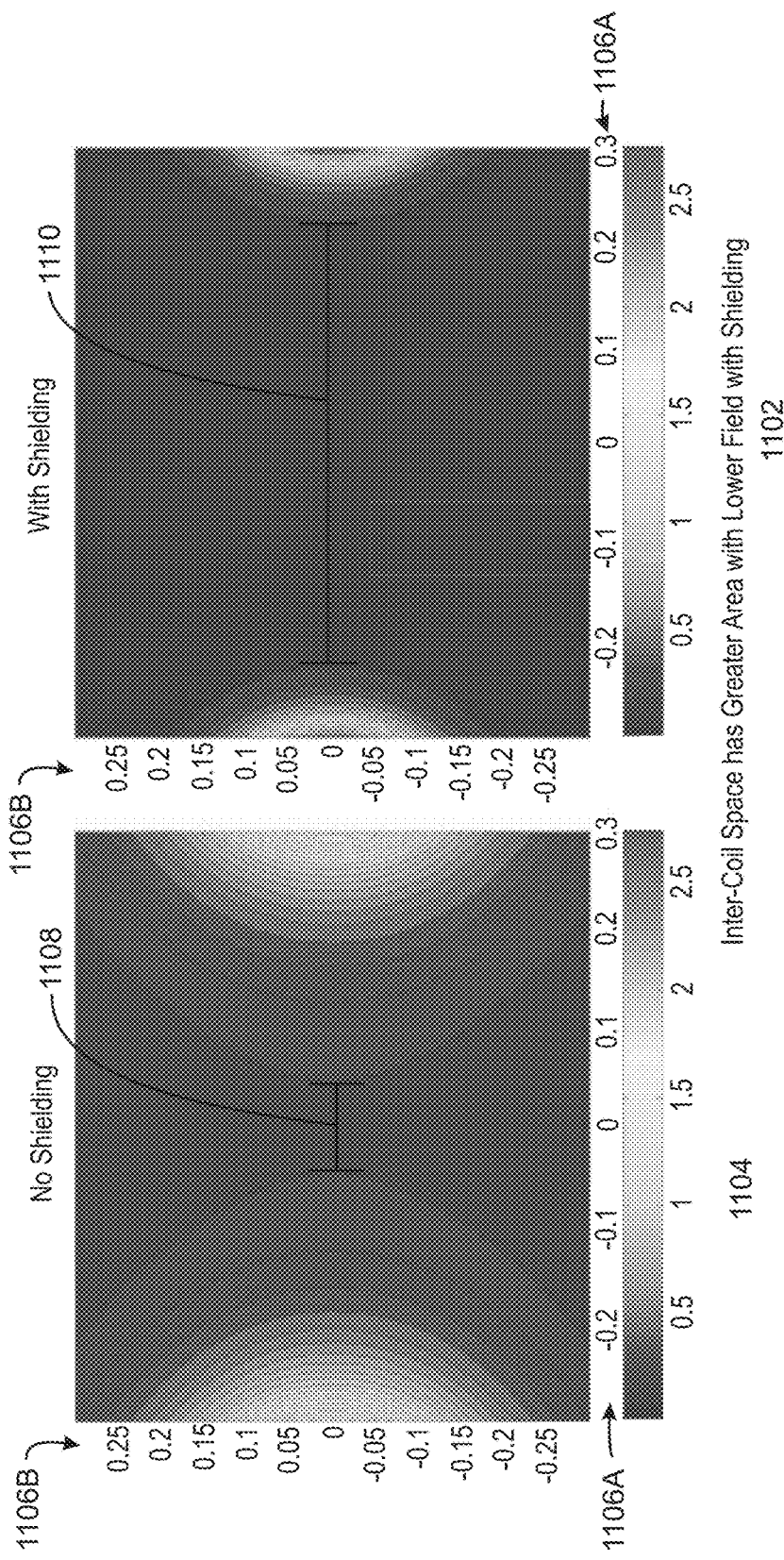
FIG. 11 is an illustration of the limited magnetic field pattern resulting from two coils with an active shield side by side.
Figure 12:
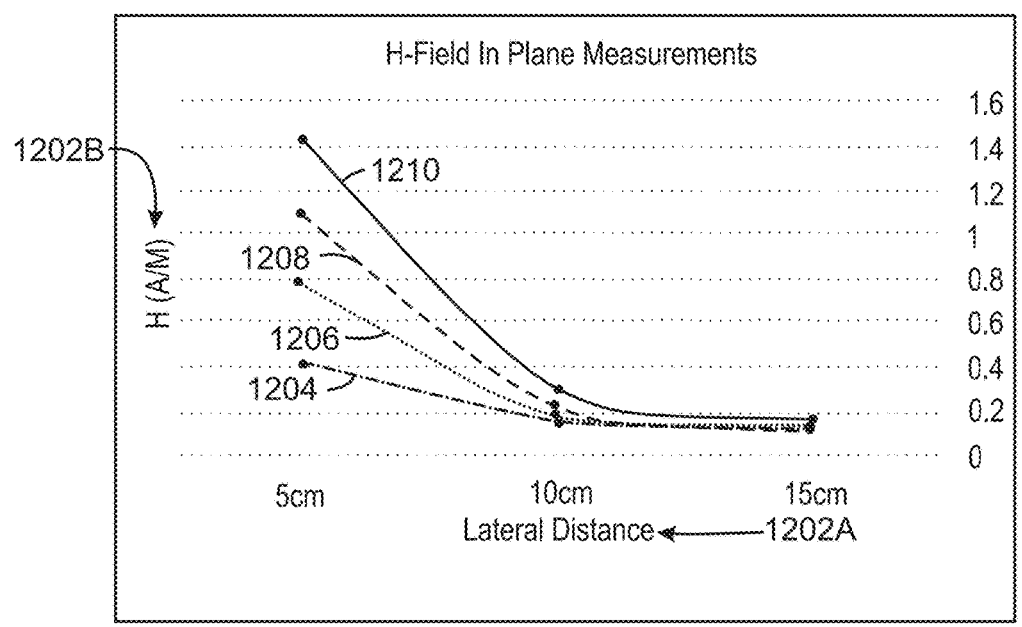
FIG. 12 is a plot of magnetic field magnitude as a function of distance in four directions.

FIG. 11 is an illustration of the limited magnetic field pattern resulting from two coils with an active shield side by side. The coils may be, for example, coils from FIG. 8, 9, or 10. The x-axis 1106A represents a distance, while the y-axis 1106B represents a distance. The solid areas in the middle of the inter-coil space represents a lower magnetic field. For example, the distance represented by item number 1108 on graph 1104 has a smaller length of a lower magnetic field when compared to the distance represented by item number 1110 on graph 1102 with shielding. FIG. 12 is a plot 1200 of magnetic field magnitude as a function of distance in four directions. The x-axis 1202A represents lateral distance, while the y-axis 1204B represents magnetic field H measured in amperes per meter. The exponential decay equation used to fit the measured field values is as below:

$$y = \alpha e^{-\beta x}$$

where $\alpha$ and $\beta$ are parameters derived on the measured field data.

| Direction | A (A/m) | B (cm) |
|---|---|---|
| North | 1.43 | 0.824 |
| East | 3.0 | 1.15 |
| West | 3.7 | 1.1 |
| South | 0.7 | 0.64 |

As discussed above, the locations and positional distance of PTU coils between each other is dictated by the exponential decay model of the radiated leakage magnetic field. The exponential decay model is constructed by curve-fitting the measured leakage magnetic field decay radiated from the PTU in the peripheral direction, and is then used to estimate and guide an optimization process for minimizing the superimposed electromagnetic radiation exposure to humans from one or multiple coils installed in furniture used in an office or home setting.

The measured magnetic field for a single coil in the four directions (North 1206, East 1210, West 1208, South 1204) within the same plane (i.e. plane of the coil) are shown in Table 1. The maximum value occurs close to the coil and steadily drops off as one moves away from it. However, as a multiplicity of coils are incorporated in places like a conference room or a class room, the interaction fields generated due to the superposition of individual coil fields, give rise to complex field patterns that require careful evaluation to ensure safety of users exposed to such client settings.

Figure 13:
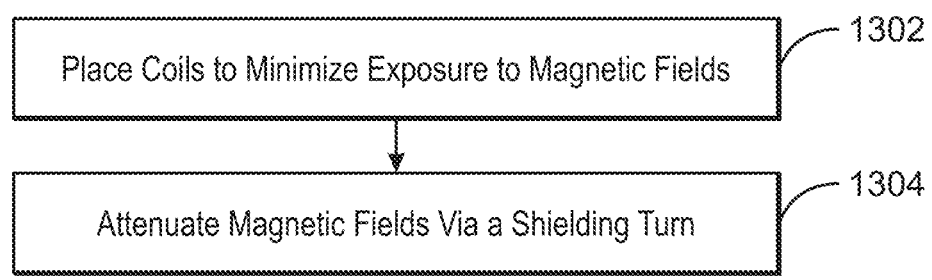
FIG. 13 is a process flow diagram of a method for coil placement.

FIG. 13 is a process flow diagram of a method for coil placement. At block 1302, the coils are placed to minimize exposure to magnetic fields. At block 1304, the magnetic fields may be attenuated as necessary through the use of shielding turns.

A systematic method for evaluation of interaction fields can enable the following objectives. First, assessment of exposure risk in public spaces where there is multiplicity of wireless charging coils for powering cellphones, tablets, etc. Then, the placement of wireless charging coils is optimized to minimize the exposure. Finally, the fields in the inter-coil region are mitigated.

An additional advantage of optimized coil placement for exposure is that it allows accelerated rate of charging of the devices used to charge with these coils, since the risk of exposure is now minimized to people routinely exposed to these coils during normal usage.

Figure 14:
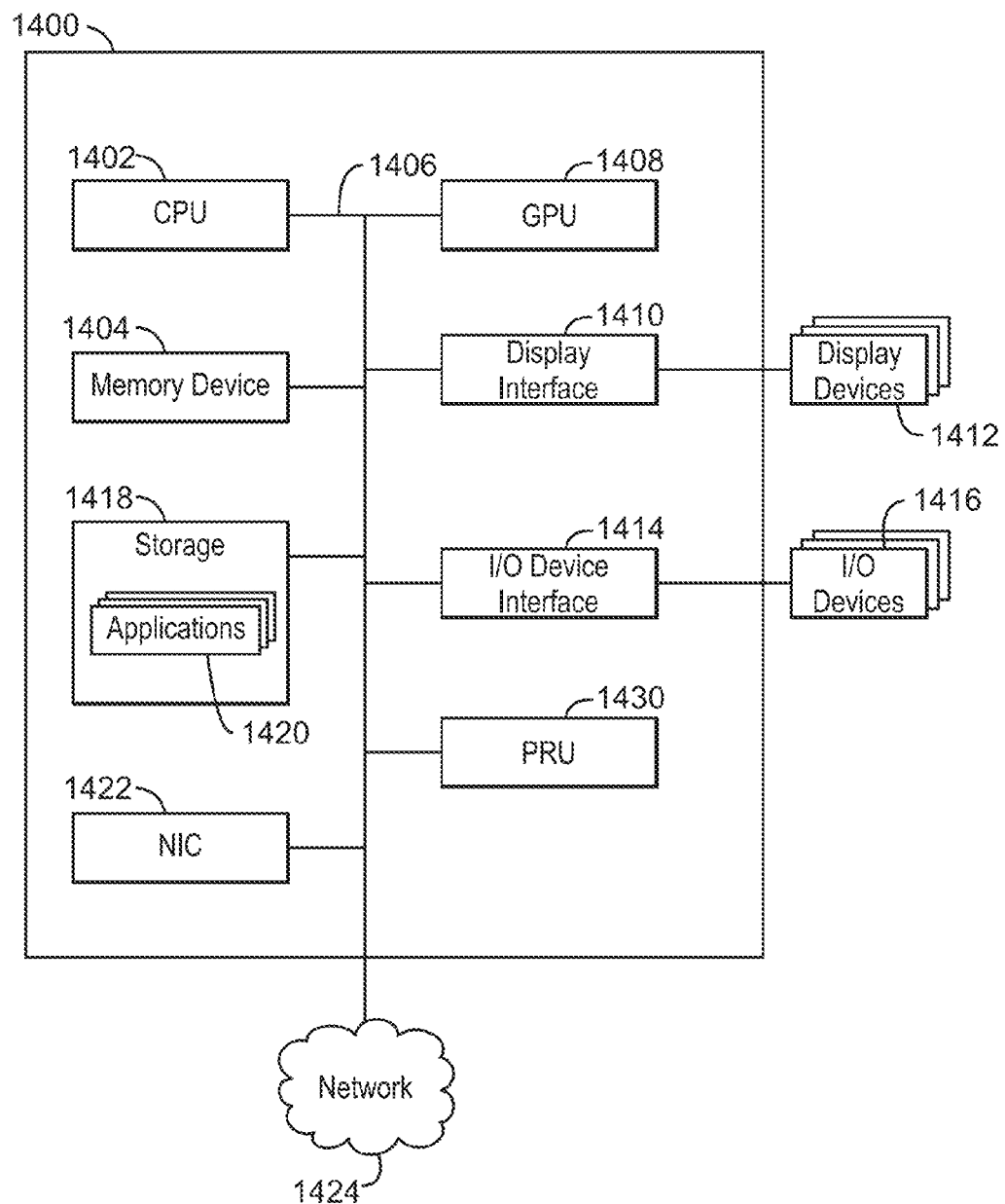
FIG. 14 is a block diagram of a computing device that may be used with a PTU.

FIG. 14 is a block diagram of a computing device 1400 that may be used with a PTU. The computing device 1400 may be, for example, a laptop computer, desktop computer, ultrabook, tablet computer, mobile device, smart phone, smart TV, or server, among others. The computing device 1400 may include a central processing unit (CPU) 1402 that is configured to execute stored instructions, as well as a memory device 1404 that stores instructions that are executable by the CPU 1402. The CPU 1402 may be coupled to the memory device 1404 by a bus 1406. Additionally, the CPU 1402 can be a single core processor, a multi-core processor, a computing cluster, or any number of other configurations. Furthermore, the computing device 1400 may include more than one CPU 1402.

The computing device 1400 may also include a graphics processing unit (GPU) 1408. As shown, the CPU 1402 may be coupled through the bus 1406 to the GPU 1408. The memory device 1404 may store instructions that are executable by the GPU 1408. The GPU 1408 may be configured to perform any number of graphics operations within the computing device 1400. For example, the GPU 1408 may be configured to render or manipulate graphics data such as graphics images, graphics frames, videos, or the like, to be displayed to a user of the computing device 1400.

The memory device 1404 can include random access memory (RAM), read only memory (ROM), flash memory, or any other suitable memory systems. For example, the memory device 1404 may include dynamic random access memory (DRAM). The CPU 1402 may also be connected through the bus 1406 to an input/output (I/O) device interface 1414 configured to connect the computing device 1400 to one or more I/O devices 1416. The I/O devices 1416 may include, for example, a keyboard and a pointing device, wherein the pointing device may include a touchpad or a touchscreen, among others. The I/O devices 1416 may be built-in components of the computing device 1400, or may be devices that are externally connected to the computing device 1400.

The CPU 1402 may be linked through the bus 1406 to a display interface 1410 configured to connect the computing device 1400 to one or more display devices 1412. The display devices 1412 may include a display screen that is a built-in component of the computing device 1400. The display devices 1412 may also include a computer monitor, television, or projector, among others, that is externally connected to the computing device 1400.

The computing device also includes a storage device 1418. The storage device 1418 is a physical memory such as a hard drive, an optical drive, a thumbdrive (such as a portable non-volatile memory storage device), an array of drives, or any combinations thereof. The storage device 1418 may also include remote storage drives. The storage device 1418 also includes applications 1420. The computing device 1400 may also include a network interface controller (NIC) 1422 configured to connect the computing device 1400 through the bus 1406 to a network 1424. The network 1424 may be a wide area network (WAN), local area network (LAN), or the Internet, among others. The computing device may also include a PRU 1430. The PRU 1430 may be coupled to a battery. The PRU may be used to charge the battery of the computing device. Moreover, the PRU may supply power to the components of the computing device, such that the components operate directly from power supplied by the PRU.

The block diagram of FIG. 14 is not intended to indicate that the computing device 1400 is to include all of the components shown in FIG. 14. Further, the computing device 1400 may include any number of additional components not shown in FIG. 14, depending on the details of the specific implementation. Moreover, the computing device 1400 may be implemented as a system on chip (SOC). In an SOC implementation, various components of the computing device 1400 are combined onto a single chip substrate.

Example 1 is an apparatus. The apparatus includes a power transmit unit coil, including a set of main windings, positioned at a first location on a structure, to carry a first current in a first direction, wherein the first current is to cause an electromagnetic field to emanate from the power transmit unit coil; and an active shielding coil, positioned at a second location on the structure, to carry a second current in a direction substantially opposite the first direction wherein the second current is to cause a reduction of the size of the electromagnetic field.

Example 2 includes the apparatus of example 1, including or excluding optional features. In this example, the power transmit unit coil and the active shielding coil are placed in circular patterns and positioned in substantially the same plane with substantially the same center. Optionally, an average radius of the active shielding coil is greater than an average radius of the power transmit unit coil.

Example 3 includes the apparatus of any one of examples 1 to 2, including or excluding optional features. In this example, the active shielding coil is to reduce a magnetic field leakage through cancellation of a magnetic field from the set of main windings.

Example 4 includes the apparatus of any one of examples 1 to 3, including or excluding optional features. In this example, a feedback mechanism is to control, at least partially, an active charging current that is to result from the electromagnetic field. Optionally, the active charging current is modified via adjustments to the first current and the second current. Optionally, the active charging current is modified in response to a power level of a receiving device, a magnetic field leakage as the receiving device is powered, another source of magnetic field interference, or any combination thereof.

Example 5 includes the apparatus of any one of examples 1 to 4, including or excluding optional features. In this example, the second current is to cancel a leaked magnetic field at a pre-defined distance.

Example 6 includes the apparatus of any one of examples 1 to 5, including or excluding optional features. In this example, the second location is selected to mitigate interference between the set of main windings and a second power transmit unit.

Example 7 is a system. The system includes a power transmit unit comprising a set of main windings, positioned at a first location on a structure, to carry a first current in a first direction; an active shielding coil, positioned at a second location on the structure, to carry a second current in a direction substantially opposite the first direction wherein the second current is to cause a reduction of the size of the electromagnetic field; and electronic circuitry that is to drive current into the power transmit unit and the active shielding coil to create a resonant inductive coupling with a power receive unit.

Example 8 includes the system of example 7, including or excluding optional features. In this example, a magnetic field leakage is reduced to a level lower than a predefined limit.

Example 9 includes the system of examples 7 and 8, including or excluding optional features. In this example, the active shielding turn is to reduce magnetic field leakage through cancellation of magnetic fields.

Example 10 includes the system of examples 7 to 9, including or excluding optional features. In this example, the set of main windings is placed in a circular pattern, and the active shielding coil is placed outside at least a portion of an outermost winding of the set of main windings in substantially the same plane with substantially the same center. Optionally, the power transmit unit is positioned in an area substantially encompassed by the active shielding coil.

Example 11 includes the system of examples 7 to 10, including or excluding optional features. In this example, the active shielding turn is to reduce magnetic field leakage in a region between multiple power transmit units through cancellation of magnetic fields.

Example 12 includes the system of examples 7 to 11, including or excluding optional features. In this example, the shielding turn ensures a uniform field distribution for a power receive unit and reduces a magnetic field between a plurality of power transmit units.

Example 13 includes the system of examples 7 to 12, including or excluding optional features. In this example, the resonant inductive coupling is to generate an active charging current that is received at the power receive unit.

Example 14 includes the system of examples 7 to 13, including or excluding optional features. In this example, the second current is to cancel a leaked magnetic field at a pre-defined distance.

Example 15 includes the system of examples 7 to 14, including or excluding optional features. In this example, the second location of the shielding turn is selected to mitigate interference between the power transmit unit and a second power transmit unit.

Example 16 is a method for coil placement. The method includes positioning a power transmit unit is a structure to minimize exposure to magnetic fields; calculating an error based on a potential magnetic field of the power transmit unit and a maximum magnetic field; and re-positioning the power transmit unit in response to the error being greater than a pre-defined threshold.

Example 17 includes the method of example 16, including or excluding optional features. In this example, the power transmit unit is positioned iteratively until the error is less than the pre-defined threshold.

Example 18 includes the method of examples 16 and 17, including or excluding optional features. In this example, the power transmit unit is encompassed by an active shielding coil that is to reduce magnetic field leakage through cancellation of magnetic fields. Optionally, the active shielding coil is to reduce magnetic field leakage in a region between multiple power transmit units through cancellation of magnetic fields.

Example 19 includes the method of examples 16 to 18, including or excluding optional features. In this example, an initial position of the power transmit unit is determined based on, at least partially, an exponential decay model of the potential magnetic field. Optionally, the exponential decay model is to minimize a superimposed electromagnetic radiation exposure to humans from one or multiple coils.

Example 20 includes the method of examples 16 to 19, including or excluding optional features. In this example, an active shielding coil enables a uniform field distribution for a power receive unit and reduces a magnetic field between a plurality of power transmit unit coils.

Example 21 includes the method of examples 16 to 20, including or excluding optional features. In this example, a position of an active shielding coil is selected to mitigate interference between a first power transmit unit and a second power transmit unit.

Example 22 is a tangible, non-transitory, computer-readable medium. The computer-readable medium includes instructions that direct the processor to position a power transmit unit is a structure to minimize exposure to magnetic fields; calculate an error based on a potential magnetic field of the power transmit unit and a maximum magnetic field; and re-position the power transmit unit in response to the error being greater than a pre-defined threshold.

Example 23 includes the computer readable medium of example 22, including or excluding optional features. In this example, the power transmit unit is positioned iteratively until the error is less than the pre-defined threshold.

Example 24 includes the computer readable medium of examples 22 and 23, including or excluding optional features. In this example, the power transmit unit is encompassed by an active shielding coil that is to reduce magnetic field leakage through cancellation of magnetic fields. Optionally, the active shielding coil is to reduce magnetic field leakage in a region between multiple power transmit units through cancellation of magnetic fields.

Example 25 includes the computer readable medium of examples 22 to 24, including or excluding optional features. In this example, an initial position of the power transmit unit is determined based on, at least partially, an exponential decay model of the potential magnetic field. Optionally, the exponential decay model is to minimize a superimposed electromagnetic radiation exposure to humans from one or multiple coils.

Example 26 includes the computer readable medium of examples 22 to 25, including or excluding optional features. In this example, an active shielding coil enables a uniform field distribution for a power receive unit and reduces a magnetic field between a plurality of power transmit unit coils.

Example 27 includes the computer readable medium of examples 22 to 26, including or excluding optional features. In this example, a position of an active shielding coil is selected to mitigate interference between a first power transmit unit and a second power transmit unit.

Example 28 is an apparatus. The apparatus includes instructions that direct the processor to a power transmit unit coil, including a set of main windings, positioned at a first location on a structure, to carry a first current in a first direction, wherein the first current is to cause an electromagnetic field to emanate from the power transmit unit coil;

and a means to cause a reduction of the size of the electromagnetic field positioned at a second location on the structure.

Example 29 includes the apparatus of example 28, including or excluding optional features. In this example, the power transmit unit coil and the means to cause the reduction of the size of the electromagnetic field are placed in circular patterns and positioned in substantially the same plane with substantially the same center. Optionally, an average distance from the center of the means to cause the reduction of the size of the electromagnetic field is greater than an average radius of the power transmit unit coil.

Example 30 includes the apparatus of examples 28 and 29, including or excluding optional features. In this example, the means to cause the reduction of the size of the electromagnetic field is to reduce a magnetic field leakage through cancellation of a magnetic field from the set of main windings.

Example 31 includes the apparatus of examples 28 to 30, including or excluding optional features. In this example, a feedback mechanism is to control, at least partially, an active charging current that is to result from the electromagnetic field. Optionally, the active charging current is modified via adjustments to the first current and the second current. Optionally, the active charging current is modified in response to a power level of a receiving device, a magnetic field leakage as the receiving device is powered, another source of magnetic field interference, or any combination thereof.

Example 31 includes the apparatus of examples 28 to 31, including or excluding optional features. In this example, a second current is to cancel a leaked magnetic field at a pre-defined distance.

Example 32 includes the apparatus of examples 28 to 31, including or excluding optional features. In this example, the second location is selected to mitigate interference between the set of main windings and a second power transmit unit.

It is to be understood that specifics in the aforementioned examples may be used anywhere in one or more embodiments. For instance, all optional features of the computing device described above may also be implemented with respect to either of the methods or the computer-readable medium described herein. Furthermore, although flow diagrams and/or state diagrams may have been used herein to describe embodiments, the present techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. An apparatus, comprising:
a plurality of power transmit unit coils, wherein a power transmit unit coil includes a set of main windings, positioned at a first location on a structure, to carry a first current in a first direction, wherein the first current is to cause an electromagnetic field to emanate from the power transmit unit coil, wherein the first location enables a maximum inter-coil magnetic field between the power transmit unit coil and another power transmit unit coil that is less than a magnetic field limit; and
an active shielding coil, positioned at a second location on the structure, to carry a second current in a direction substantially opposite the first direction wherein the second current is to cause a reduction of the size of the electromagnetic field in a region between the power transmit unit coil and another power transmit unit coil of the plurality of power transmit unit coils, wherein the first location and the second location are dictated by an exponential decay model of the electromagnetic field.

2. The apparatus of claim 1, wherein the power transmit unit coil and the active shielding coil are placed in circular patterns and positioned in substantially the same plane with substantially the same center.

3. The apparatus of claim 2, wherein an average radius of the active shielding coil is greater than an average radius of the power transmit unit coil.

4. The apparatus of claim 1, wherein the active shielding coil is to reduce a magnetic field leakage through cancellation of a magnetic field from the set of main windings.

5. The apparatus of claim 1, wherein a feedback mechanism is to control, at least partially, an active charging current that is to result from the electromagnetic field.

6. The apparatus of claim 5, wherein the active charging current is modified via adjustments to the first current and the second current.

7. The apparatus of claim 6, wherein the active charging current is modified in response to a power level of a receiving device, a magnetic field leakage as the receiving device is powered, another source of magnetic field interference, or any combination thereof.

8. The apparatus of claim 1, wherein the second current is to cancel a leaked magnetic field at a pre-defined distance.

9. The apparatus of claim 1, wherein the second location is selected to mitigate interference between the set of main windings and a second power transmit unit.

10. A system, comprising:
a power transmit unit coil comprising a set of main windings, positioned at a first location on a structure, to carry a first current in a first direction, wherein the first location enables a maximum inter-coil magnetic field between all the power transmit unit coil and another power transmit unit coil that is less than a magnetic field limit;
an active shielding coil, positioned at a second location on the structure, to carry a second current in a direction substantially opposite, the first direction, wherein the second current is to cause a reduction of the size of the electromagnetic field in a region between the power transmit unit coil and the another power transmit unit coil of a plurality of power transmit unit coils, wherein the first location and the second location are dictated by an exponential decay model of the electromagnetic field; and
electronic circuitry that is to drive current into the power transmit unit coil, the another power transmit unit coil, and the active shielding coil to create a resonant inductive coupling with a power receive unit.

11. The system of claim 10, wherein a magnetic field leakage is reduced to a level lower than a predefined limit.

12. The system of claim 10, wherein the active shielding turn is to reduce magnetic field leakage through cancellation of magnetic fields.

13. The system of claim 10, wherein the set of main windings is placed in a circular pattern, and the active shielding coil is placed outside at least a portion of an outermost winding of the set of main windings in substantially the same plane with substantially the same center.

14. The system of claim 13, wherein the power transmit unit coil is positioned in an area substantially encompassed by the active shielding coil.

15. A method for coil placement, comprising:
- positioning a power transmit unit coil of a plurality of power transmit unit coils in a structure to minimize exposure to magnetic fields at a first position that is determined via an exponential decay model of a potential magnetic field;
- determining a maximum inter-coil magnetic field of each coil of the plurality of power transmit unit coils;
- calculating an error based on the potential magnetic, field of the power transmit unit coil and the maximum inter-coil magnetic field of the power transmit unit coil and another power transmit unit coil; and
- re-positioning the power transmit unit in response to the error being greater than a pre-defined threshold.

16. The method of claim 15, wherein the power transmit unit coil is positioned iteratively until the error is less than the pre-defined threshold.

17. The method of claim 15, wherein the power transmit unit coil is encompassed by an active shielding coil that is to reduce magnetic field leakage through cancellation of magnetic fields.

18. The method of claim 17, wherein the active shielding coil is to reduce magnetic field leakage in a region between multiple power transmit units through cancellation of magnetic fields.

19. The method of claim 15, wherein the exponential decay model is constructed by curve-fitting a measured leakage magnetic field decay radiated from the power transmit unit in a peripheral direction.

* * * * *